No. 839,710. PATENTED DEC. 25, 1906.
J. BIJUR.
BOOSTER REGULATOR.
APPLICATION FILED NOV. 25, 1905.
2 SHEETS—SHEET 1.
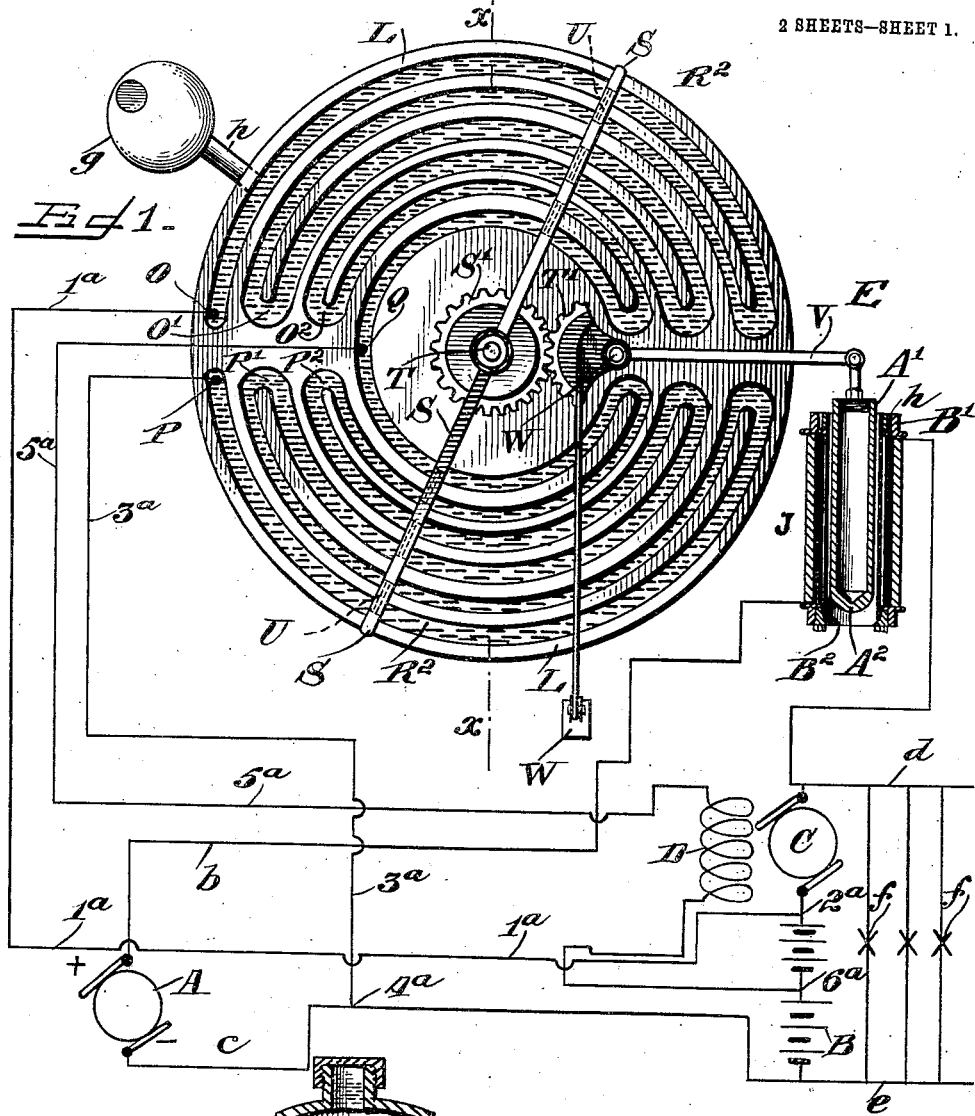

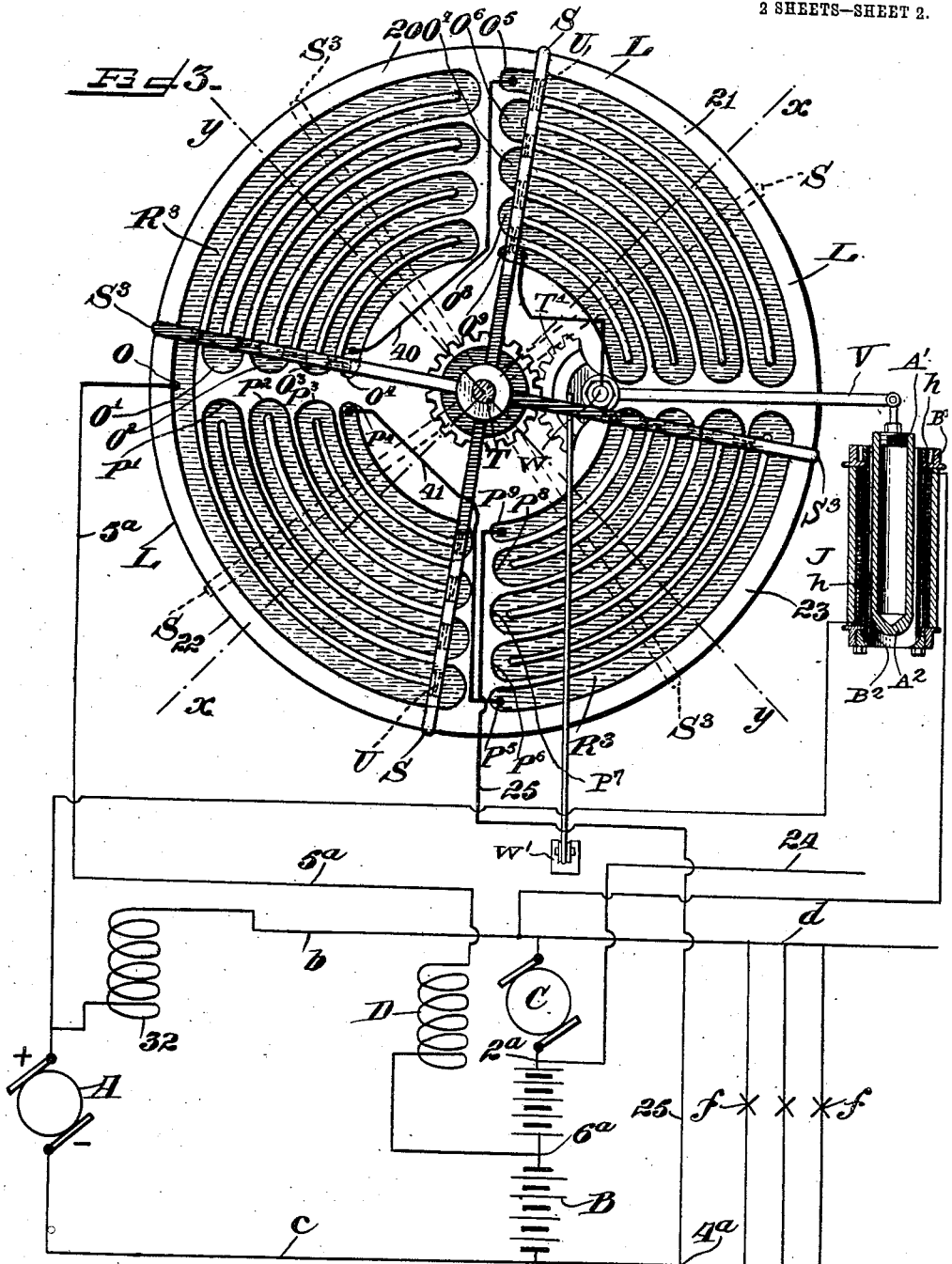

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

BOOSTER-REGULATOR.

No. 839,710.　　　　Specification of Letters Patent.　　　　Patented Dec. 25, 1906.

Application filed November 25, 1905. Serial No. 288,991.

*To all whom it may concern:*

Be it known that I, JOSEPH BIJUR, a citizen of the United States, and a resident of the borough of Manhattan, city, county, and State of New York, have invented certain new and useful Improvements in Booster-Regulators, of which the following is a specification, accompanied by drawings.

This invention relates to systems of electric distribution in which storage batteries are used in addition to the generating-dynamo and an auxiliary dynamo is provided to cause the battery to charge or discharge as the external load decreases or increases. The voltage of the auxiliary dynamo is made to vary in direction and amount, or both, as the voltage requirements of the system may necessitate.

The objects of the invention are to maintain a substantially constant load on the generating dynamo with a fluctuating external load and to improve upon the means for varying the voltage of the auxiliary dynamo with the external load.

To these ends the invention consists of the system of regulation, apparatus, and devices for carrying out the above objects, consisting of the combination of elements, features of construction, and arrangement of parts having the general mode of operation substantially as hereinafter fully described and claimed in this specification and shown in the accompanying drawings, in which—

Figure 1 is a diagrammatic representation of apparatus embodying the invention. Fig. 2 is a detail sectional elevation of the reservoir shown in Fig. 1. Fig. 3 is a diagrammatic representation of a modification of Fig. 1.

Referring to the drawings, A represents a suitable dynamo or source of supply connected to the mains $b$ and $c$, while the work portion of the system carrying the external load is represented by the conductors $d$ and $e$. In this instance the load is represented by the lamps $f$ by way of illustration. Connected across the mains is shown a storage battery B, in series with which is arranged the armature of the auxiliary dynamo C, the field D of which is connected to be varied both in direction and amount by the electromagnetic controller, (represented by E,) which controls the liquid resistance connected in circuit with the field-winding D of dynamo C. The controller E is so connected as to be responsive to changes in the external load of lamps or other electroreceptive devices.

In systems of booster control it is desirable to obtain very minute gradations of resistance and substantially frictionless contact between the parts of a switch in order to best control the booster. These requirements are met in a very efficient manner by liquid resistances having electrodes or conductors dipping therein, the position of which electrodes determines the resistance in circuit. Salt water, dilute sulfuric acid, and also those liquid resistances having high resistance which are not chemically decomposed by the current are suitable for carrying out this invention. Since the water of the electrolyte is decomposed, it is expedient to provide means for replenishing the water—as for instance, a reservoir. Suitable means are provided, regulated in accordance with changes in the external load of the system for controlling and varying the liquid resistance.

It is of course desirable to obtain as large a range of movement of the controlling devices for the resistance as possible with a very small movement of the parts which are directly actuated by the magnet J. It is also desirable to obtain as great a range of control as possible of the resistance with a very small movement of the actuating parts, thereby making the regulator very quick acting.

In Fig. 1 a large and long liquid resistance is arranged within a very small space, and multiplication of motion is obtained, whereby very efficient results are secured. In this instance liquid resistance $R^2$ is arranged in a continuous trough L, which winds back and forth and is encompassed within the outline of a circle. From the end O of the trough a wire $1^a$ connects with the point $2^a$ at the positive side of the battery. From the other end P of the trough the wire $3^a$ connects with the negative side of the system at the point $4^a$. The point Q on the resistance represents substantially its mid-point—that is to say, one-half of the trough containing the liquid extends from one side of the point Q and the other half extends at the other side. From this mid-point Q a wire $5^a$ is led to the coil D, which is also connected to the mid-point $6^a$ of the battery B.

A suitable switch-arm S, carried upon the shaft or spindle T, is adapted to move in either direction over or in front of the troughs or trough L, containing the resistance $R^2$, and this arm is also provided with points, contacts, or electrodes U, which dip into the liquid resistance $R^2$ and are connected together in pairs, as shown, bridging adjacent troughs, thereby short-circuiting the sets of troughs. When one end of the arm S lies across the ends O, O', and $O^2$ of one portion of the troughs, it will be seen that there is direct connection from the end O through the contacts U and ends O' and $O^2$ to the point Q, thereby short-circuiting all of the resistance at one side of the regulator. The same thing is true when one end of the arm S is opposite or over the ends P, P', and $P^2$ of the resistance, in which case the liquid resistance on the other side of the regulator is short-circuited between the points P and Q. When resistance at one side of the regulator is short-circuited, the resistance at the other side is all in circuit—that is to say, when there is a direct connection from O to Q the circuit must traverse the entire line of troughs at the other side of the regulator from P to Q, and when there is a direct connection between P and Q the circuit must traverse the entire line of troughs at the other side from O to Q.

Suitable means are provided for actuating the arm S, in this instance a spindle or shaft w being provided with a gear S', meshing with a segmental gear T', carried by the reversing-arm V, pivoted at W and connected to be actuated by the core A' of the magnet h in the casing B'.

Throughout the range of movement of the core there will be a constant pull exerted by the weight W' in any position of the core when the magnet is traversed by a constant current. In the construction of this magnet J, B' represents an iron casing for the coil h, adapted to receive the core A', one end of which extends beyond the casing, the other end $A^2$ being rounded and terminating inside of the casing. The lines of force from A' to B', where A' passes through B', are always horizontal and exert no tractive effort. The lines of force from the rounded end $A^2$ of A' to a similarly-curved end $B^2$ of B' vary in number as the rounded end of A' approaches the rounded portion of B'. This variation in number of lines, hence in tractive force, is compensated by the variation in direction of the lines due to the curvature of A' and B' in such a manner that the component of the pull along the axis of A' diminishes inversely as the number of lines increase. Hence the tendency of A' to move axially is constant with any given current throughout the range in which such variation of direction of the lines can be made to compensate for the variation in their quantity. In other words, the iron-clad solenoid and core are so shaped that for a considerable movement of the core for any given current the increase in the number of lines of force between the rounded end of the core and the rounded part of the casing is compensated by the diminishing component of these lines in an axial direction, due to a change in their direction.

In order to compensate for decomposition of the liquid by the current, a reservoir g, with a hermetically-sealed cover, is provided, connected to the trough L at h by a nozzle. The trough L, as stated, is continuous from beginning to end, and as long as the liquid in the trough is below the level of the nozzle h the electrolyte will flow out of the reservoir g into the trough. When the liquid in the trough covers the nozzle h', the liquid is sealed against flowing and ceases to exude from the nozzle. The single reservoir g is sufficient to maintain the level substantially constant throughout the entire extent of the trough L.

When the arm S is directly across the trough L on the line x x, there will be no current flowing through the field D of dynamo C, because the arm S is then on the central points of the resistance and there is no difference of potential between the ends of the field-coil D. When one end of the arm S is over the ends O, O', and $O^2$, there will be maximum current flowing through the field D in one direction—that is, from the point $2^a$ at the positive side of the battery, by wire $1^a$ to the point O, thence through the electrodes U and O' and $O^2$ of the trough to the central point Q, thence by wire $5^a$ through field D and mid-point $6^a$ of the battery.

When one end of the arm S lies over or opposite the ends P, P', and $P^2$ of the trough, the maximum current will flow in the other direction through the field D—that is, from the point $6^a$ on the battery, by wire $5^a$, through the field D, thence to the mid-point Q on the liquid resistance, and by the electrodes U and ends $P^2$ and P' to the point P, thence by wire $3^a$ to the point $4^a$ on the negative main. Between the maximum and minimum points the current may be changed in direction and amount, as desired, according to the movement of the arm S, controlled by the magnet J, in accordance with variations in the external load of the system. The function of the apparatus shown in Fig. 3 is the same as that shown in Fig. 1 and operates in the same manner to control the booster.

In Fig. 1 the arm S must move through one hundred and eighty degrees, and in order to reduce this movement to produce the same amount of variation the apparatus may be constructed as shown in Fig. 3, in which the trough is in three sections, one being continuous from the point $O^4$ to the point $P^4$ and from $O^5$ to $O^9$ and from $P^5$ to $P^9$, the whole being arranged in four quarters 20, 21, 22, and 23, in each of which quarters there are eight concentric lines of the trough L. The three sections are connected to each other by wires, making one continuous resistance. A wire 40 connects the points $O^4$ and $O^5$. Wire 41 connects the points $P^4$ and $P^5$. Upon the central shaft or spindle T are arranged two cross-arms or switch-arms S and $S^3$, secured substantially at right angles to each other. The arm S coöperates with the sections 21 and 22 of the trough, while the arm $S^3$ coöperates with the sections 20 and 23. Each arm is provided with electrodes U, connected in pairs, as illustrated in Fig. 2, and bridging adjacent pairs of troughs, so that two sections—as, for instance, sections 20 and 21—of the trough may be short-circuited at the same time, or else these two sections 20 and 21 may be included in circuit, while the other two sections 22 and 23 are short-circuited. In one case the maximum current in one direction will flow through the field D, while in the other case the maximum current will flow in the other direction. When the arm S lies upon the line $x\ x$ and when the arm $S^3$ lies upon the line $y\ y$, there will be no current flowing through the coil D, because the arms S and $S^3$ then lie upon the central points of the liquid resistance $R^3$ contained in the troughs L, and there is no difference of potential between the ends of the field-coil D, and hence no current-flow.

The middle point O of the trough-sections 20 and 22 is connected by wire $5^a$ to the coil D, the other terminal of which coil is connected to the mid-point $6^a$ of the battery. It will be seen that the trough in section 20 is arranged back and forth in the form of a quarter-segment, beginning from the point O and ending at the point $O^4$. The trough is then connected to the point $O^5$ by wire 40. Section 21 is arranged back and forth to form the concentric troughs, ending at the point $O^9$. Likewise the trough in section 22 is arranged back and forth concentrically between the mid-point O and the end $P^4$, and it is then connected by wire 41 up to the point $P^5$, where section 23 begins, and from thence the trough is arranged in quarter-segment, ending at the point $P^9$. The point or end $O^9$ of section 21 is connected by wire 24 to point $2^a$ at the positive side of the battery B, while the point $P^9$ is connected by wire 25 to the point $4^a$ on the negative main. According to this construction it will be seen that when one end of the arm $S^3$ lies opposite or across ends O, $O'$, $O^2$, $O^3$, and $O^4$, section 20, and one end of arm S lies across ends $O^5$, $O^6$, $O^7$, $O^8$, and $O^9$ of section 21 both said sections will be short-circuited, and maximum current will flow through the coil D in one direction. On the other hand, when one end of arm S lies upon or opposite the end P, $P'$, $P^2$, $P^3$, and $P^4$ of section 22 and one end of arm $S^3$ lies over or opposite the ends $P^5$, $P^6$, $P^7$, $P^8$, and $P^9$ of section 23 both said sections will be short-circuited, and maximum current will flow through the field D in the opposite direction. With the arms in the first position described—that is, opposite the end O and the end $O^5$—the current will flow from the point $2^a$ at the positive side of the battery B, through wire 24, to the end $O^9$, thence through the points or electrodes U and the ends $O^8$ $O^7$ $O^6$ $O^5$, from thence through the wire 40 to the point $O^4$, thence by electrodes U and the points $O^3$, $O^2$, $O'$, and O, by wire $5^a$, through the coil D, and to the mid-point $6^a$ on the battery.

When the arms S and $S^3$ are in the second position above described—that is, over the points P and $P^5$—the current will flow from the mid-point $6^a$ on the battery, through the coil D, by wire $5^a$, to the point P, thence to electrodes U and points $P'$ $P^2$ $P^3$ $P^4$, through the wire 41 to the point $P^5$, thence by electrodes U and points $P^6$, $P^7$, $P^8$, and $P^9$ to the wire 25, and back to the point $4^a$ on the negative main of the system. Between the maximum points of flow in opposite directions lie the neutral points, and it will thus be seen that any desired current in either direction may be obtained in the field D, the function of the control of the booster being the same as described for Fig. 1.

As before stated, any change in the load on the generator A will result in a change in the magnetization of the regulator E, which thereby varies the liquid resistance $R^2$ and produces a corresponding change in the voltage of the auxiliary dynamo C.

Obviously some features of this invention may be used without others, and the invention may be embodied in widely-varying forms.

Therefore, without limiting the invention to the devices shown and described and without enumerating equivalents, I claim, and desire to obtain by Letters Patent, the following:

1. In a regulator the combination with a source of supply, of a circuit to be regulated and a liquid resistance arranged in substantially parallel concentric lines in circular form, a contact-arm provided with contacts adapted to bridge adjacent pairs of said concentric lines of resistance, whereby one portion of said resistance may be short-circuited while the other is included in circuit, and means for actuating said arm.

2. In a regulator the combination with a source of supply, of a circuit to be regulated, and a liquid resistance arranged in substantially parallel concentric lines in circular form, a contact-arm provided with contacts adapted to bridge adjacent pairs of said concentric lines of resistance, whereby one portion of said resistance may be short-circuited while the other is included in circuit, and means connected to operate said arm in accordance with changes in the circuit.

3. In a regulator the combination with a source of supply, a circuit to be regulated, and a liquid resistance arranged in concentric lines and divided into equal number of segmental sections, contact-arms arranged substantially at angles to each other equal to the angles subtended by said sections and provided with contacts adapted to bridge adjacent lines of resistance at each section, and means for short-circuiting half said sections and including the other half said sections in circuit.

4. In a regulator the combination with a source of supply, of a circuit to be regulated, and a liquid resistance arranged in concentric lines and divided into segmental sections, contact-arms arranged substantially at right angles and provided with contacts adapted to bridge adjacent lines of resistance at each section, and means for operating said arms in accordance with changes in the circuit.

5. In a regulator the combination with a source of supply, of a circuit to be regulated, and a liquid resistance made up of an electrolyte in an even number of concentrically-arranged troughs, a series of movable electrodes immersed in adjacent troughs and adapted to short-circuit portions of said resistance, and means responsive to change in the electrical condition of the circuit, whereby said electrodes are moved to vary said resistance.

6. In a regulator the combination with a source of supply, of a circuit to be regulated, and one or more liquid resistances connected to control the circuit, means for varying the value of said resistances inversely to each other and a reservoir for replenishing the liquid in said resistance.

7. In a regulator the combination with a source of supply, of a circuit to be regulated, an auxiliary generator, and one or more liquid resistances connected to control the field-circuit of the auxiliary generator, means for varying the value of said resistances inversely to each other and a reservoir constructed to automatically replenish the liquid in said resistance.

8. An electric regulator comprising a liquid resistance arranged in substantially parallel concentric lines in circular form, a contact-arm provided with contacts adapted to bridge adjacent pairs of said concentric lines of resistance, whereby one portion of said resistance may be short-circuited while the other is included in circuit, means for actuating said arm and means controlled by said regulator.

9. An electric regulator comprising a liquid resistance arranged in concentric lines and divided into an equal number of segmental sections, contact-arms arranged substantially at right angles to each other equal to the angles subtended by said sections and provided with contacts adapted to bridge adjacent lines of resistance at each section whereby half of said sections may be short-circuited and the other half included in circuit, means for actuating said arms, and means controlled by said regulator.

In testimony whereof I have signed this specification in the presence of two subscribing witnesses.

JOSEPH BIJUR.

Witnesses:
OLIN A. FOSTER,
A. L. O'BRIEN.